United States Patent [19]
Rohrlick et al.

[11] Patent Number: 5,241,722
[45] Date of Patent: Sep. 7, 1993

[54] RAMP SYSTEM

[75] Inventors: Myles A. Rohrlick, Oceanside; Blaine K. Rawdon, Rancho Palos Verdes, both of Calif.

[73] Assignee: McDonnell Douglas Corporation, Long Beach, Calif.

[21] Appl. No.: 793,182

[22] Filed: Nov. 18, 1991

Related U.S. Application Data

[63] Continuation-in-part of Ser. No. 648,280, Jan. 31, 1991, and a continuation-in-part of Ser. No. 648,281, Jan. 31, 1991.

[51] Int. Cl.$^5$ .............................................. B64D 9/00
[52] U.S. Cl. ................................. 14/71.5; 244/137.1
[58] Field of Search ................... 14/71.3, 71.5, 71.7; 244/137.1, 137.4, 118.1

[56] References Cited

U.S. PATENT DOCUMENTS

| | | | |
|---|---|---|---|
| 3,128,068 | 4/1964 | Pauli | 244/129 |
| 3,147,942 | 9/1964 | Griffith | 244/137 |
| 3,538,528 | 11/1970 | Porter et al. | 14/71.5 |
| 4,032,092 | 6/1977 | Day | 244/137 R |
| 4,039,163 | 8/1977 | Shorey | 14/71.5 X |
| 4,235,399 | 11/1980 | Shorey | 244/137 R |
| 4,832,286 | 5/1989 | Brookes | 244/118.3 |

*Primary Examiner*—William P. Neuder
*Attorney, Agent, or Firm*—John P. Scholl; Donald E. Stout

[57] ABSTRACT

A ramp system in a first embodiment incorporates a fore and an aft ramp section interconnected by a spindle which permits both pitch and roll movement of the aft section relative to the fore section. The fore section is hingedly connected to an aircraft structure at an opening thereof so that the fore section is capable of pitch movement relative to the aircraft. A set of hydraulic actuators provide controlled movement to the sections and additionally secure the sections in their desired positions. A set of rollers and curved tracks on adjoining portions of the sections both provide secure interconnection of the sections and prevent yaw movement of the aft section relative to the fore section. Rotation of the aft section relative to the fore section allows quick and simple disconnection and removal of the aft section and thereby provides interchangability with alternate aft sections adapted to provide the aircraft with alternate functional capabilities. The second embodiment is essentially similar to the first embodiment except that it utilizes a ramp which is directly connected to an aircraft structure via the spindle and set of rollers and tracks so that the ramp is removeable from the aircraft structure and interchangeable with other ramps.

27 Claims, 10 Drawing Sheets

RAMP SYSTEM

This application is a continuation-in-part of application Ser. Nos. 648,280 and 648,281 both filed Jan. 31, 1991 and now pending.

BACKGROUND OF THE INVENTION

The invention relates generally to ramps and more particularly to cargo ramps used to provide aircraft with multi role functions such as in flight refueling and cargo transport.

Modern aircraft which have the capability of transfering fuel to another aircraft while in flight generally use permanently installed fuel tank systems and fuel transfer systems. These "tanker" aircraft employ either of two fuel transfer systems, the probe and drogue system or the boom system. The probe and drogue system employs a flexible hose with a receiver drogue at the end which trails behind the tanker aircraft. The receiver aircraft employs a probe which engages a fitting in the drogue. When engagement is made, fuel is pumped to the receiver aircraft. The system is retracted by rolling the hose up on a large reel in the tanker aircraft. The boom system employs a rigid, telescoping boom which is hinged at the tanker aircraft's aft end. The boom location is controlled by aerodynamic surfaces to mounted to it. A fitting at the end of the boom engages a receptacle in the receiver aircraft, and fuel is transferred. The system is retracted by telescoping the boom to minimum length and hoisting the boom up against the aft underside of the aircraft. Although some tanker aircraft are converted cargo aircraft which may be reconverted back to a cargo aircraft configuration, the conversion process is very time consuming and in practice is not actually done. In addition, although some tanker aircraft are capable of carrying both cargo and fuel simultaneously, or only fuel, or only cargo, such aircraft are not able to operate from short or austere fields. Furthermore, these aircraft require extensive material handling equipment to function as cargo aircraft, and they cannot handle large rolling stock loads such as trucks and tracked vehicles. Other cargo aircraft which have been converted to tanker aircraft are capable of probe and drogue refueling operations but not boom refueling operations.

In different phases of a military operation there may be variations in demand for tanker and cargo aircraft. Sometimes demand for cargo aircraft is high while demand for tanker aircraft is low, and vice versa. The time period of these fluctuations may be quite short. Consequently, there may be difficulty in meeting such demands within the time period required with the result that the military operation may be handicapped.

Some prior art aircraft incorporate different and interchangeable sections into the basic airframe structure in order to allow the aircraft to accomodate many different types and sizes of payloads so that the aircraft can best fulfill a number of different mission objectives. An example of such a prior art aircraft is disclosed in U.S. Pat. No. 4,449,679 to McComas. However, the McComas invention can only be applied to twin-tailboom type aircraft. In addition, the demountable portion of the aircraft cannot function as a cargo ramp and cannot be rotated in pitch or roll to accomodate loading platforms, loading trucks, etc.

Other prior art aircraft incorporate removable cargo floors so that the floor can function as a preloaded cargo pallet in order to reduce loading and unloading time. An example of such a prior art aircraft is disclosed in U.S. Pat. No. 2,876,969 to Tydon. The Tydon disclosure describes a rapidly removable aircraft floor which can tilt and function as a ramp. However, The Tydon floor is a major fraction of the aircraft fuselage structure requiring substantial structural compromises to the airframe. In addition, since the Tydon floor lacks independent pitch, roll and vertical motion capability, it lacks the ability to align with other cargo vehicles.

A ramp system is thus needed that is capable of providing ramp alignment with cargo vehicles. Additionally, a ramp system is thus also needed that is capable of providing very rapid conversion between an aircraft providing a specialized operational function such as, for example, a full-fledged tanker aircraft (with both probe-and-drogue and boom capability) and a full-fledged cargo aircraft. A system is also needed that can provide such conversion while being simple and easy to use.

SUMMARY OF THE INVENTION

It is a principal object of the present invention to provide a ramp system having a removable ramp or ramp section to provide multi use capability to the system.

It is another object of the present invention to provide a ramp system having a ramp or ramp section which is rotatable in two dimensions for alignment of the ramp with vehicles, structures and terrain to facilitate interaction of the system therewith.

It is also another object of the present invention to provide a ramp system having a removable ramp or ramp section which accomodates various equipment to permit aircraft on which the system is used to perform a variety of desired functions.

It is also an object of the present invention to provide a ramp system having a ramp or ramp section which is modular so that it is simple and easy to remove from and connect to other components of the system.

It is also an object of the present invention to provide a ramp system having a ramp or ramp section which may be quickly, simply and easily connected to other desired system of the vehicle on which the ramp system is used.

It is still another object of the present invention to provide a ramp system allowing all the equipment needed to remove and install desired ramps or ramp sections to be transported on the vehicle on which the ramp system is used.

The ramp system of the present invention is specifically designed to be used on an aircraft or other vehicle which has an opening for loading and unloading cargo, personnel, etc. In a first embodiment, the ramp system of the present invention utilizes a fore ramp section and an aft ramp section. The fore section is connected to a suitable structure of an aircraft or other vehicle by means of a hinge which allows the fore section to rotate in a longitudinal direction so that an oppositely located end portion of the fore section can move vertically. The aft section is connected to the fore section by means of a spindle. The spindle has a hinge connecting it to the fore section and a pair of bearings by which it is connected to the aft section. The spindle's hinge connection has a lateral axis of rotation allowing the aft section to rotate longitudinally relative to the fore section. The spindle's hinge connection allows the aft section to move generally vertically upon rotational movement of the fore section. The spindle's bearings are concentrically mounted on the spindle shaft allowing the aft section to rotate laterally relative to the fore section. The capability of the aft section to rotate in two dimensions allows the aft section to accomodate cargo trucks and loading docks which are not level with and/or have a different lateral angle of inclination than the aircraft. In addition, the rotational capability of the aft section allows the aft section to accomodate uneven or rough terrain. In a second embodiment, the ramp system incoporates a single ramp which is directly and detachably connected to the aircraft via a spindle and is otherwise similar to the first embodiment.

The ramp system incorporates a pair of hydraulic actuators which connect the aircraft (specifically an aircraft structure located at the aircraft opening) to rear end portions of the aft section of the first embodiment or the ramp of the second embodiment. The hydraulic actuators move the rear portion of the aft section or ramp up and down and tilt it laterally. Thus, the actuators impart both longitudinal and lateral rotational movement to the aft section or ramp. In addition, the actuators have sufficient strength to hold the aft section or ramp securely in a desired position within the range of longitudinal and lateral movement of which it is capable.

The ramp system also includes a set of tracks and moveable members (which may be, for example, rollers or sliding blocks) mounted on adjoining portions of the fore and aft sections of the first embodiment or the ramp and aircraft structure of the second embodiment. The set of tracks are curved to allow lateral rotational movement of the aft section or ramp, and the portion of the fore section or aircraft structure located above and blow the moveable members are angled forward to allow a limited degree of longitudinal movement to the aft section or ramp. By more precisely locating the forward lateral end portions of the aft section or ramp during rotation thereof, the set of rollers and tracks generally minimize wobbling or undesired fore, aft and lateral movement of the aft section or ramp during rotation and while securely positioned.

To remove the aft section from the fore section or the ramp from the aircraft structure, the aft section or ramp is simply tilted until the rollers come off their tracks. Once the rollers are off their tracks, the aft section or ramp may be simply pulled longitudinally until the spindle disengages the aft section or ramp. Disconnection of the hydraulic actuators from the aft section or ramp allows complete removal of the aft section or ramp from the other components of the ramp system. Connection of the aft section or ramp to the fore section or the aircraft structure is simply the reverse of removal. The ramp system thus provides a modular ramp section or ramp which allows interchangability of aft sections or ramps. This allows a ramp or ramp aft section used for loading and unloading cargo to be interchanged with a ramp or ramp aft section containing fuel tanks and the other refueling equipment (for example, refueling boom and retraction system, fuel pump and refueling sensors) needed to provide the aircraft with in flight refueling capabilities. Quick connect fittings between the aircraft and the cargo ramp for fuel, power (hydraulic or electric) and signals (both to and from the ramp) facilitate the conversion. Other aircraft functions which may be supported by the specialized modular ramp section or ramp include: 1) air rescue ramp with facilities for air rescue such as flares, rafts, special cameras and sensors, viewing ports, etc.; 2) electronics countermeasures ramp equipped with special equipment such as receivers, transmitters, special antennas, etc.; 3) anti-submarine warfare ramp complete with magnetic anomaly detector boom, sonobuoys, weapons, etc.; 4) flare ejection ramp with the capability to disperse large quantities of flare and chaff; 5) fire fighting ramp in which the ramp functions as a controlled opening and dispersal unit for large quantities of fire fighting chamicals carried in the cargo bay; 6) chemical dispersal ramp featuring a broad spanwise boom, plumbing and pump system for the dispersal of agricultural chemical or biological or chemical warfare agents; 7) personnel retrieval system with the capability of picking up people from the ground while in flight; 8) armament ramp in which the ramp may be configured to carry and eject bombs or missiles, or in which the ramp may be set up with weapons such as a machine gun and aiming system. Additionally, the ramp system of the second embodiment allows an aircraft having a conventional ramp to be converted to the ramp system of the present invention by removing the conventional ramp and mounting the spindle and the rollers directly on appropriate aircraft structures.

BRIEF DESCRIPTION OF THE DRAWINGS

FIG. 8b is a cross-sectional view of the lock pin and spindle of the first embodiment of the invention taken along lines A—A of FIG. 8a.

FIG. 12b is a cross-sectional view of the spindle and lock pin of the second embodiment of the invention taken along lines A—A of FIG. 12a.

DETAILED DESCRIPTION OF THE PREFERRED EMBODIMENT

Figure 1:
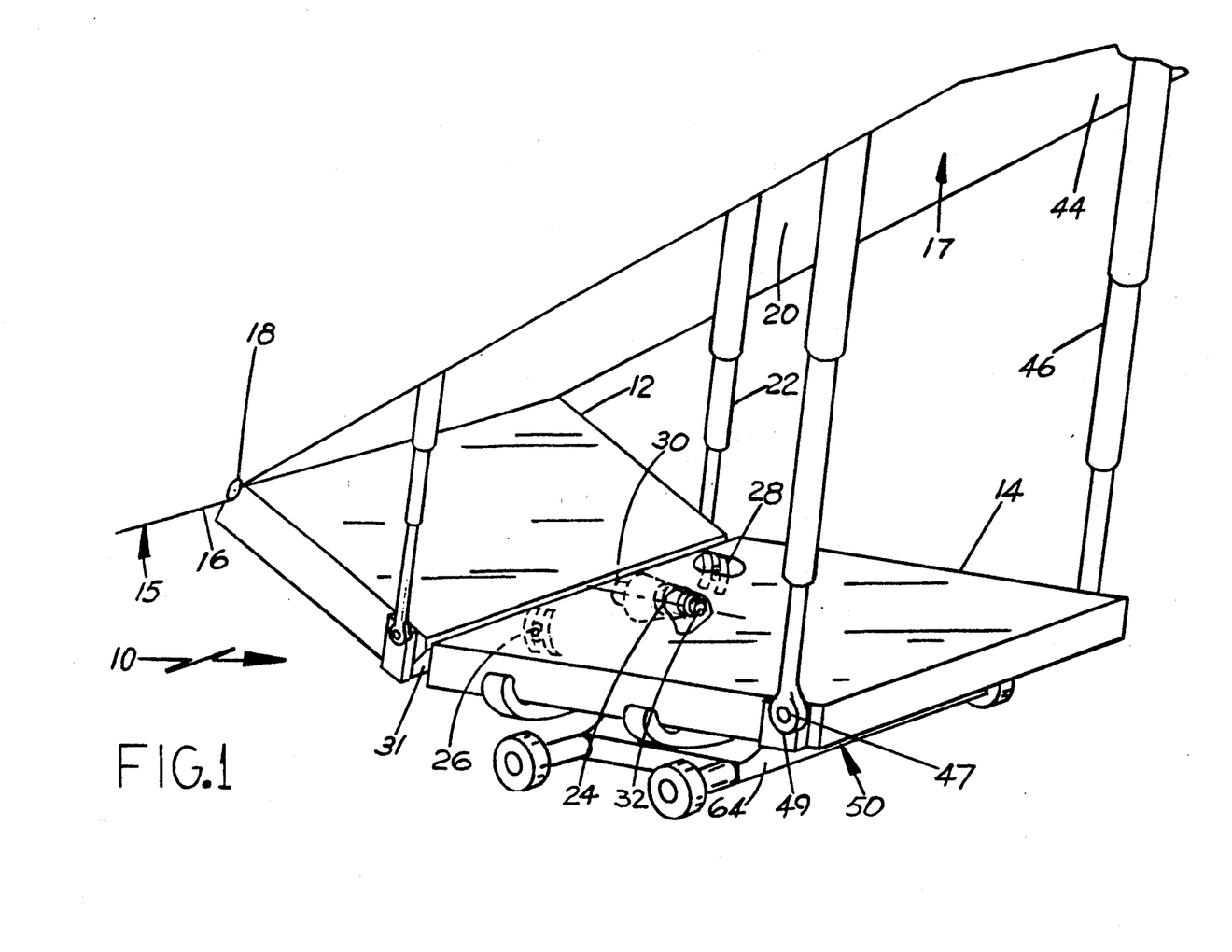
FIG. 1 is a perspective view of a first embodiment of the ramp system of the present invention shown connected to an aircraft and depicting the spindle and set of rollers and tracks in phantom.

Referring to FIG. 1 of the drawings, a first embodiment of the ramp system of the present invention is generally designated by the numeral 10. The ramp system 10 includes a fore section 12 and an aft section 14. The fore section 12 is connected to a suitable aircraft structure 16 (located preferably at a cargo opening thereof) preferably by means of a conventional hinge 18. Hinge 18 allows longitudinal rotation of fore section 12 relative to the aircraft structure 16, as shown in FIG. 1. The fore section is also connected, preferably at its rear lateral end portions, to a second suitable aircraft structure 20 by means of preferably a pair of first hydraulic actuators 22, as shown in FIG. 1. Actuators 22 rotate the fore section relative to the aircraft structures 16 and 20 and also secure the fore section 12 in the desired position within the range of rotational movement provided by the actuators 22 as well as the hinge 18 and associated structures.

The aft section 14 is preferably detachably connected to the fore section 12 preferably by means of spindle 24 and a set of moveable members 26 and guide tracks 28. The set of moveable members 26 and tracks 28 will be described in detail hereinbelow.

Figure 2:
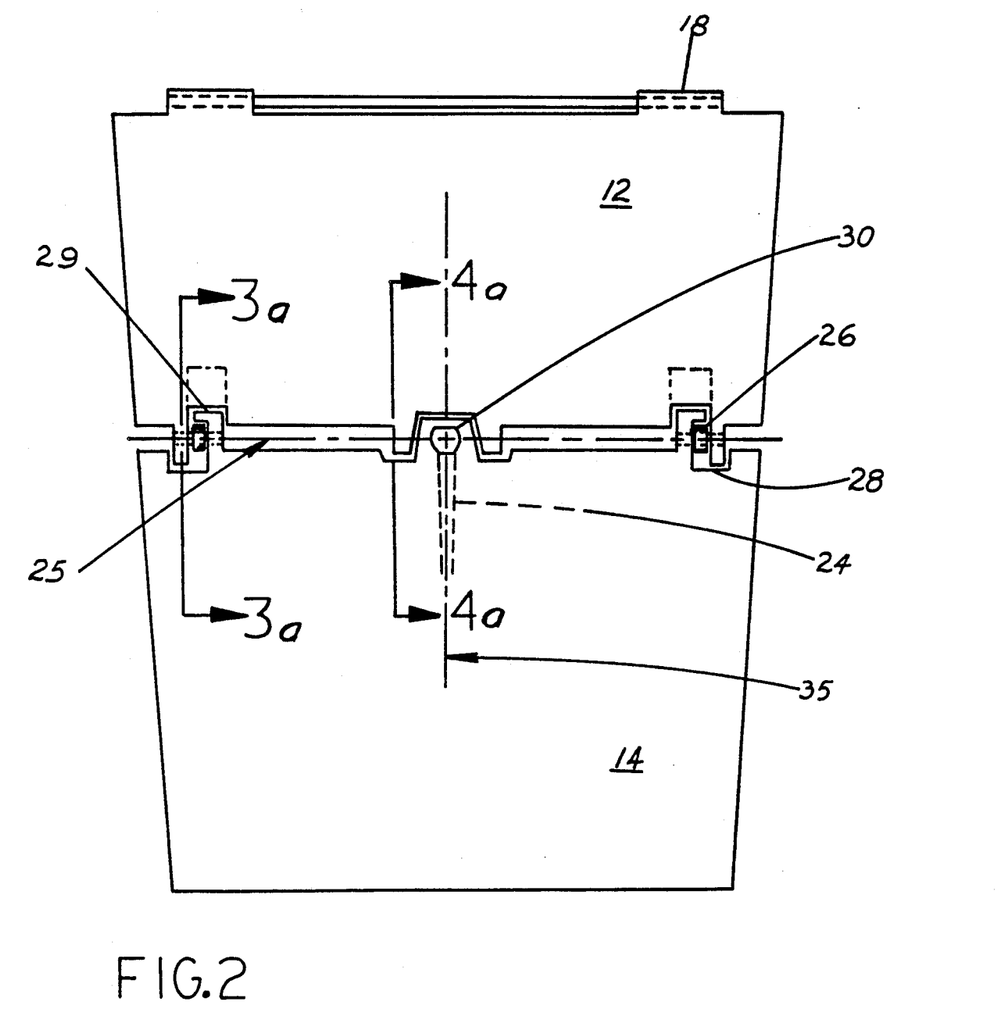
FIG. 2 is a top plan view of the fore and aft sections of the first embodiment of the ramp system of the present invention.
Figure 3A:
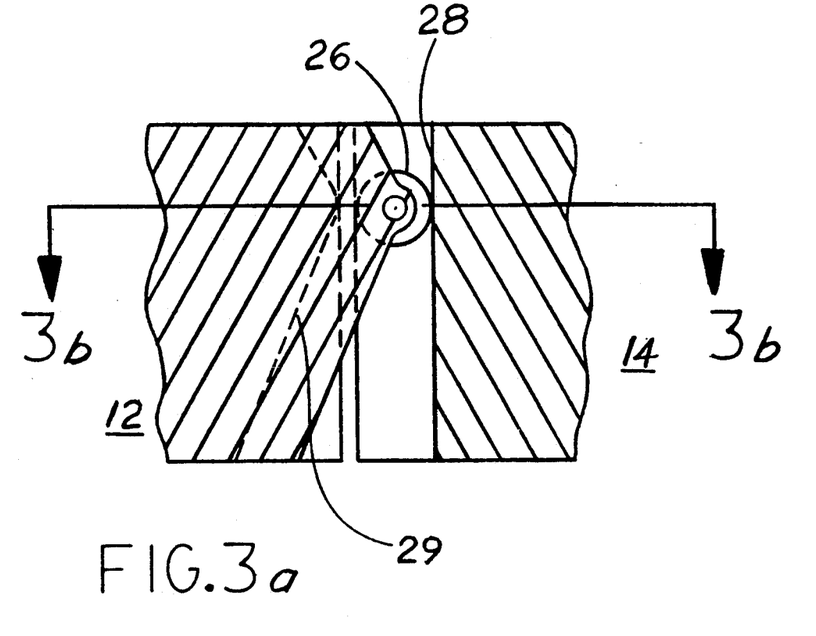
FIG. 3a is a sectional view of the fore and aft sections and other system components of the first embodiment of the invention taken along lines A—A of FIG. 2 and showing representative roller and tracks in detail.
Figure 4A:
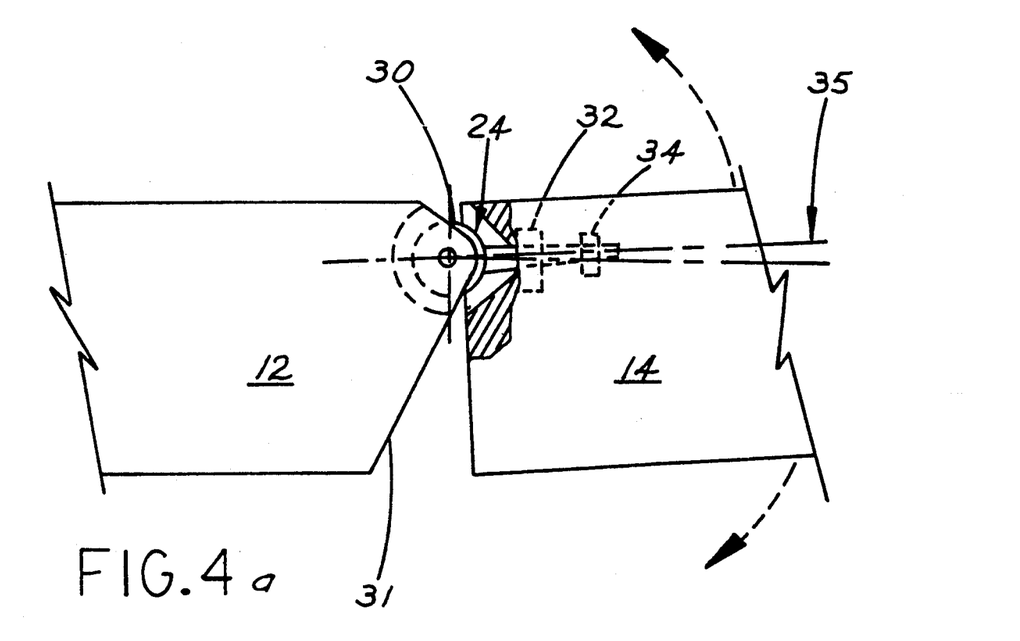
FIG. 4a is a sectional view of the fore and aft sections and other system components of the first embodiment of the invention taken along lines B—B of FIG. 2 and showing the spindle in detail.
Figure 4B:
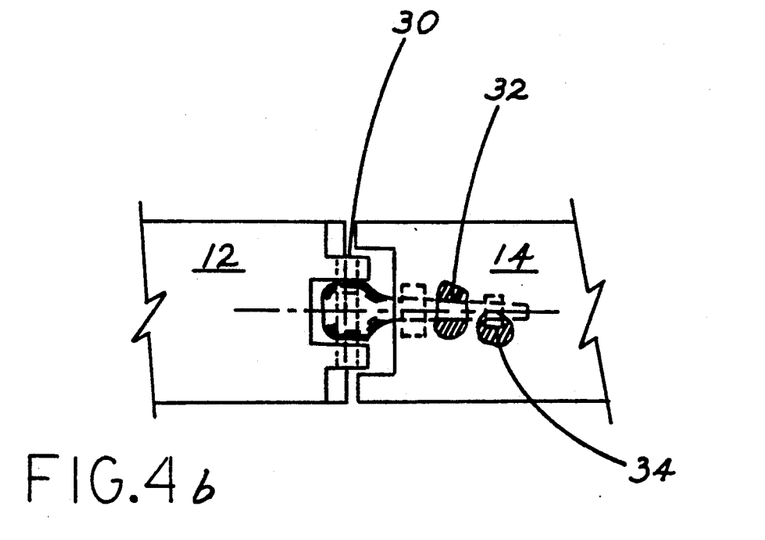
FIG. 4b is a sectional view of the fore and aft sections and other system components of the first embodiment of the invention taken along lines D—D of FIG. 4a and showing the spindle in more detail.
Figure 5:
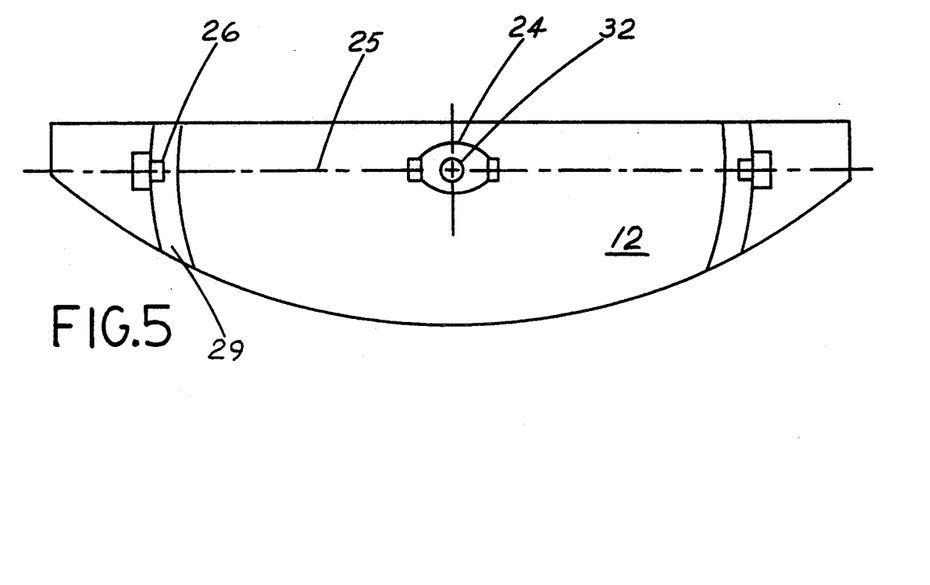
FIG. 5 is a rear elevational view of the fore section of the ramp system of the first embodiment of the invention showing the rollers and the spindle.
Figure 6:
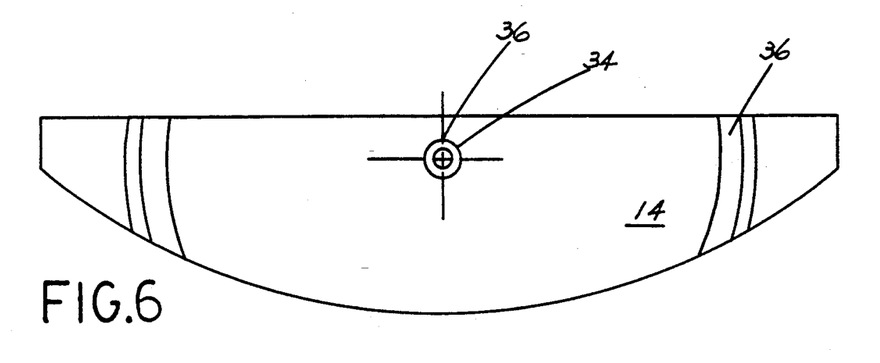
FIG. 6 is a front elevational view of the aft section of the ramp system of the first embodiment of the invention showing the tracks, the spindle recess and one of the spindle bearings.

The spindle 24 is connected to the fore section 12 preferably by means of a second hinge 30 which has its theoretical axis of rotation 25 oriented generally laterally with respect to the sections 12 and 14, as shown in FIG. 2. This allows the aft section 14 to rotate generally longitudinally (or pitch) relative to the fore section 12, as shown in FIG. 4a. The rear end surfaces 31 of the fore section 12 are preferably sloped or inclined forwardly from the theoretical axis of rotation 25 of the hinge 30, as shown in FIGS. 3a and 4a, in order to accomodate the pitching movement of the aft section 14 relative to the fore section 12. The spindle shaft 32 is preferably provided with a pair of bearings 34. The shaft 32 and bearings 34 are received by a recess 36 in aft section 14 which allow both detachable interconnection of the fore and aft sections 12 and 14 and lateral rotation (or roll) of the aft section 14 about theoretical axis of rotation 35, relative to the fore section 12. A lock pin 38 is preferably provided to generally retain the spindle 24 in aft section 14. The lock pin and associated structures will be described in detail hereinbelow.

The aft section is connected to the aircraft 15 preferably at a third aircraft structure 44 preferably by means of a second pair of hydraulic actuators 46. The connection of the actuators 46 to the aircraft structure 44 preferably allows a degree of longitudinal rotational movement of the actuators 46 relative to the aircraft structure 44 in order to allow the actuators 46 to rotate the aft section 14 relative to the fore section 12. Actuators 46 preferably work generally independently of each other and thereby rotate the aft section 14 relative to the third aircraft structure 44 and also secure the aft section 14 in the desired position within the range of rotational movement provided by the actuators 46 as well as the spindle. Thus, the actuators 46 provide secure positioning of the aft section 14 at any desired position within its longitudinal and lateral rotational range of positions. The actuators 46 are preferably detachably connected to the aft section 14 by means of bolts 47 (or pins or other structures which allow quick detachment) which pass through and thereby secure the lower ends 49 of the actuators 46 to preferably rear portions of the aft section 14. The lower ends 49 are preferably heim joints in order to allow the aft section a degree of lateral rotational motion relative to the ends 49 of the actuators 46 to enable the actuators 46 to laterally rotate the aft section 14.

Figure 3B:
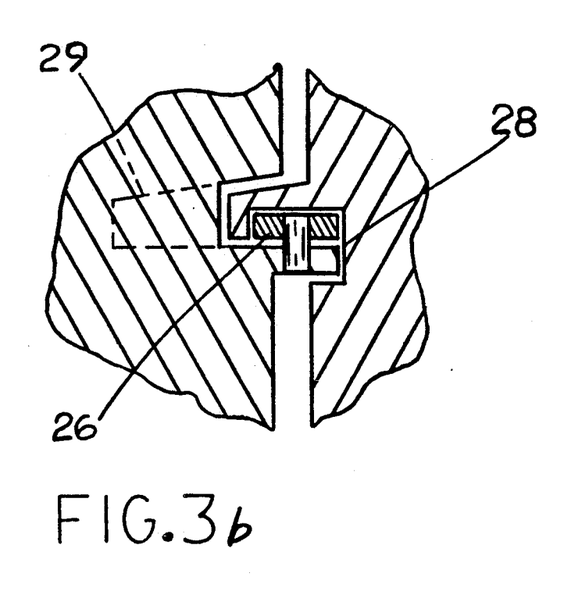
FIG. 3b is a sectional view of the fore and aft sections and other system components of the first embodiment of the invention taken along lines C—C of FIG. 3a and showing the representative roller and tracks in more detail.

In order to minimize undesired yaw movement of the aft section 14 relative to the fore section 12, the set of moveable members 26 and tracks 28 (preferably a pair of moveable members 26 and tracks 28) are provided, as shown in FIGS. 1, 3a and 3b. However, the pair of members 26 and tracks 28 may instead also be a plurality of pairs or sets of members 26 and tracks 28 in order to reduce point loads thereon. The moveable members 26 are preferably rollers although they may also be sliding blocks to reduce point loads thereon. The pair of rollers 26 are preferably mounted on a rear portion of the fore section 12, and the pair of tracks 28 are preferably mounted on an adjoining front portion of the aft section 14. The rollers 26 are generally coaxial with the spindle hinge 30 to allow lateral rotation of the aft section 14 relative to the fore section 12 while still allowing longitudinal rotation of the aft section 14 relative to the fore section 12. A track recess 29 adjacent the rollers 26 is provide don the rear end portion of the fore section 12 to receive the roller support ear 27 of the track 28. The track recess 29 is preferably sloped or inclined forward from the line of the axis of the spindle hinge 30 in order to accomodate the pitching movement of the aft section 14 throughout its range of lateral rotational movement. The tracks 28 are preferably curved with the curvature center approximately at the center of the spindle 24 to allow lateral rotation of the aft section 14 about the longitudinal axis of the spindle 24. In addition, when in engagement, the tracks 28 are positioned on fore and aft sides of the rollers 26 in order to generally guide movement of the rollers 26 and thereby movement of the aft section 14. Since the rollers 26 ride on track surfaces which are generally perpendicular to the longitudinal spindle axis, the rollers 26 and tracks 28 generally prevent or minimize fore, aft and lateral movement of the aft section 14 and thereby generally prevent or minimize wobbling thereof.

The length of the tracks 28 allow the aft section 14 approximately a maximum of eight degrees of rotation from a horizontal orientation (or level orientation with respect to the fore section 12). Rotation of the aft section 14 in excess of this eight degrees will result in disengagement of the rollers 26 from the tracks 28. However, when the rollers 26 and tracks 28 are in engagement, they prevent separation (in the longitudinal direction) of the fore and aft sections 12 and 14. Since engagement of the spindle 24 with the aft section 14 (in the recess 36) prevents relative movement and therefore separation of the fore and aft sections in the lateral and vertical directions, engagement of the rollers 26 and tracks 28 and spindle 24 and recess 36 provide secure interconnection of the fore and aft sections 12 and 14. Conversely, disengagement of the rollers 26 and tracks 28 allows removal and disconnection of the aft section 14 from the fore section by simply moving the aft section 14 in a longitudinal direction away from the fore section 12.

Figure 8A:
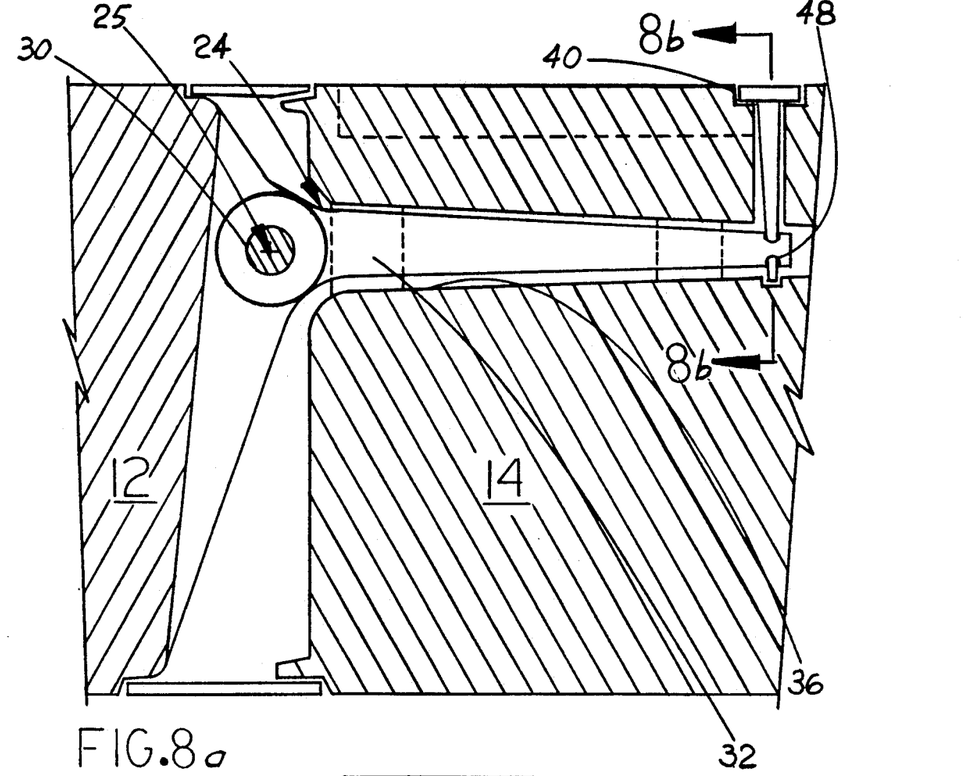
FIG. 8a is a longitudinal sectional view of the spindle, associated portions of the fore and aft sections and the lock pin therefor of the first embodiment of the invention.
Figure 8B:
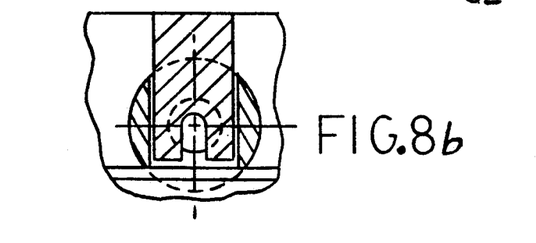
Figure 9A:
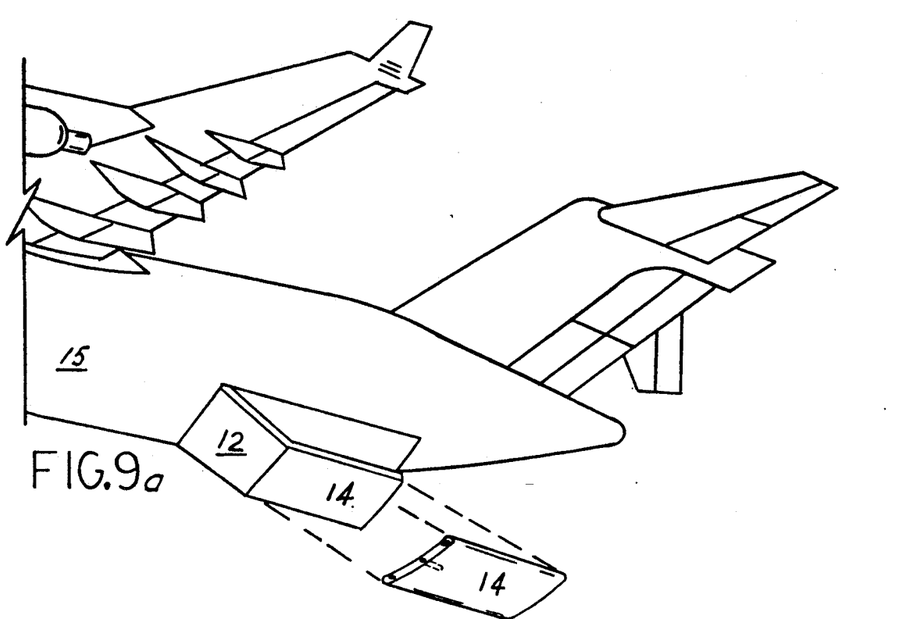
FIG. 9a is a perspective view of the fore and aft sections of the first embodiment of the invention connected to an aircraft at the cargo opening thereof, and showing an aft section adapted for cargo loading and unloading.
Figure 9B:
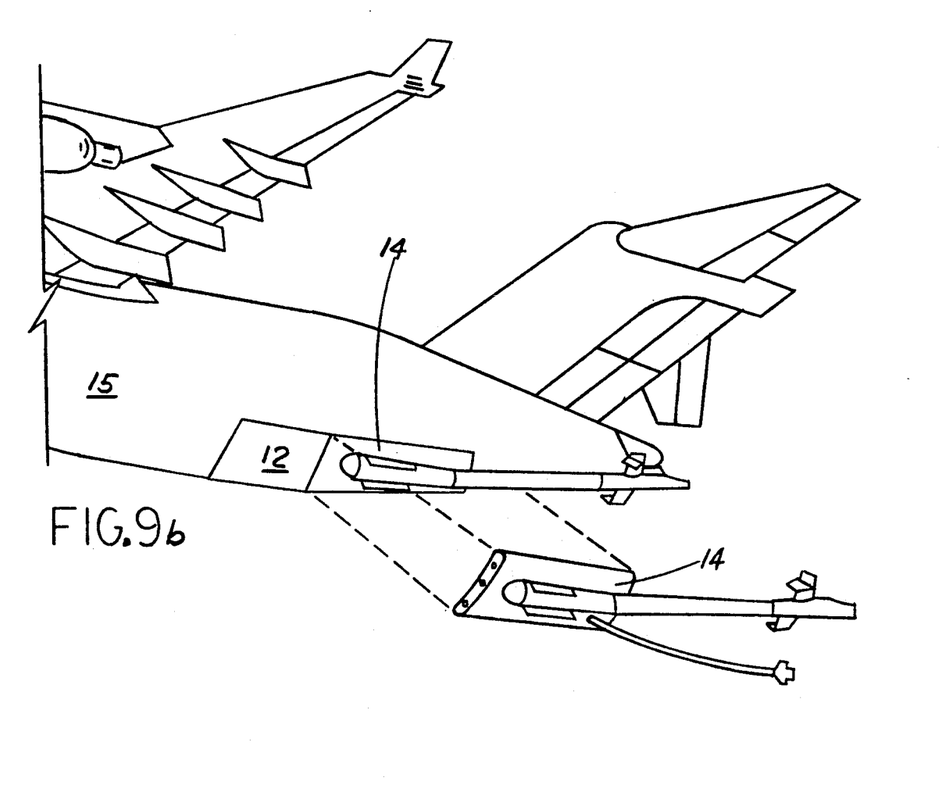
FIG. 9b is a perspective view of the fore and aft sections of the first embodiment of the invention connected to an aircraft at the cargo opening thereof, similar to the depiction of FIG. 9a, except showing an aft section adapted for in flight refueling.
Figure 9C:
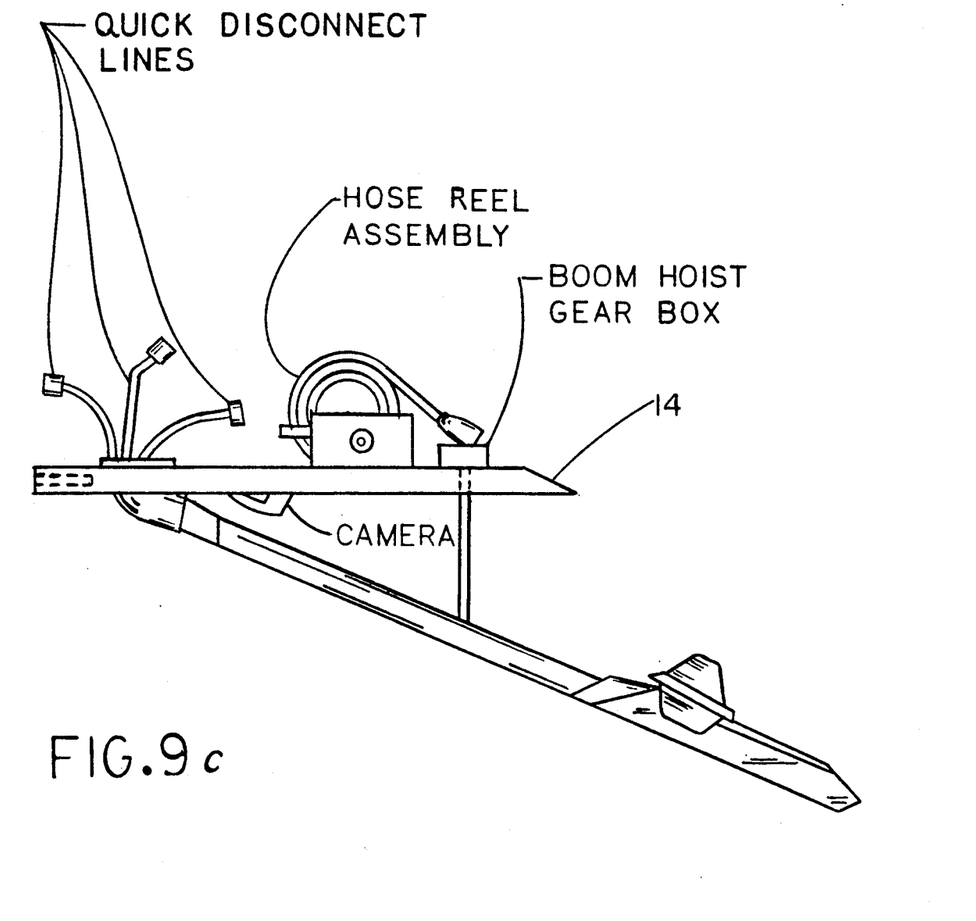
FIG. 9c is a side elevational view of the aft section of FIG. 9b showing the in flight refueling equipment installed thereon in more detail.

Lock pin 38 and associated structures are preferably provided as a safety measure to prevent unintentional disconnection of the aft section 14 from the fore section 12 which may otherwise result from excessive lateral rotation of the aft section 14. The lock pin 38 preferably is provided with a channel 42 and preferably fits in a preferably generally vertically oriented slot 40 in the aft section 14, as shown in FIGS. 8a and 8b. Manual insertion of the pin 38 in slot 40 and insertion of the spindle 24 into recess 36 allows channel 42 to receive the spindle 24. The spindle 24 is preferably provided with an indentation or groove 48 at preferably a rear longitudinal end portion thereof so that the pin 38 can prevent separation of the spindle from the aft section 14 and generally lock the spindle 24 in a desired position in the aft section 14.

Figure 7:
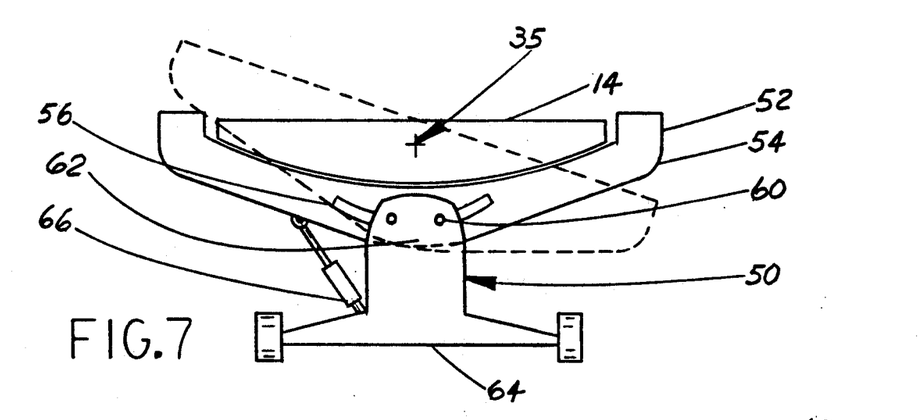
FIG. 7 is a rear elevational view of the dolly and aft section of the first embodiment of the invention showning the dolly holding the aft section and illustrating the rotational capability of the dolly.

A dolly 50 facilitates removal and installation of the aft section 14. The dolly 50 preferably has gripping members 52 on its upper platform 54 in order to hold the aft section 14 on the platform 54. The dolly preferably has tilt (or lateral rotation) capability so that it can rotate the aft section 14 into a position of engagement of rollers 26 and tracks 28 for secure connection of the aft section 14 to the fore section 12. The tilt capability is provided by a curved track 56 at preferably both longitudinal end portions 58 of the platform 54. Rollers 60 on corresponding longitudinal end portions 62 of the base 64 of the dolly 60 engage the track 56 thereby allowing lateral rotation of the platform relative to the base 64. A preferably hydraulic actuator 66 provides controlled rotational movement to the platform 54 and securely holds the platform in the desired tilted or level position. However, a simple worm gear/crank or other suitable actuator means may be used instead of hydraulic actuator 66. The theoretical axis of rotation of the dolly 50 is preferably coaxial with the theoretical axis of rotation 35 of the aft section 14 in order to allow the ramp section 14 to roll laterally without the dolly 50 moving laterally or vertically. In order to remove the aft section 14 from the fore section 12, the dolly 50 is rolled into position under the aft section 14 and the platform gripping members 52 hold the aft section 14 and the hydraulic actuators 46 may be disconnected from the aft section 14 by removal of the bolts 47 securing the lower ends 49 of the actuators 46 to the aft section 14. The dolly hydraulic actuator 66 rotates the aft section 14 until the rollers 26 disengage the tracks 28. Once the rollers 26 are disengaged from the tracks 28, the lock pin 38 may be removed from the aft section 14 thereby releasing the spindle 24 and allowing the aft section to be simply moved rearward and thereby separated from and disconnected from the fore section 12.

After removal of the aft section 14 from the fore section 12, the dolly 50 may be used to load both itself and the section 14 into the aircraft 15. In order to accomplish this, the dolly 50 is provided with a range of rotational movement sufficient to enable it to tilt the aft section 14 enough to clear the aircraft opening 17. This allows the dolly 50 with the aft section 14 to be simply rolled into the aircraft 15 (when an alternate aft section 14 suitable for cargo loading is properly connected to the fore section 12). The capability of transporting all the equipment necessary to removal and install the ramp system components, enables the aft section 14 to be interchanged in the field with another aft section 14 adapted for different functions.

This provides the aircraft with multi role capability allowing the aircraft to converted to and from any of certain desired functions quickly and easily and in field situations. Thus, the versatility of aircraft utilizing the ramp system of the present invention is greatly enhanced.

FIGS. 10, 11, 12a and 12b show a second embodiment of the invention generally designated by the numeral 110. Embodiment 110 is particularly adapted to allow conversion of an aircraft 115 having a conventional prior art ramp to the ramp system of the present invention. Embodiment 110 is generally similar to embodiment 10 except that embodiment 110 does not incorporate a fore section. Instead, embodiment 110 includes a ramp 114 which is detachably connected directly to a first aircraft structure 116 (preferably located at an aircraft opening 117) by means of spindle 124 and a set of moveable members (preferably slidable blocks) 126 and guide tracks 128. The rear surface portion of the aircraft structure 116 is preferably sloped generally forwardly above and below the spindle 124 and slidable blocks 126 in order to allow the ramp 114 to rotate longitudinally relative to the aircraft structure 116. As with embodiment 10, spindle 124 has a hinge 130. Hinge 130 connects the spindle 124 to the aircraft structure 116 while allowing longitudinal rotational movement of the spindle 124 relative to the aircraft structure 116. Spindle 124 also fits within a recess 136 in ramp 114 and is provided with preferably a pair of bearings 134 mounted preferably on spindle shaft 132 which enable lateral rotational movement of the ramp 114 (generally about axis 135) relative to the aircraft structure 116. There are preferably recesses in aircraft structure 116 for receiving ears 127 of blocks 126 in order to accomodate longitudinal rotational movement of the ramp 114 throughout its range of lateral rotational movement.

The ramp 114 is preferably generally secured to the first aircraft structure 116 both by insertion of the spindle 124 within the recess 136 and by engagement of the slidable blocks 126 and tracks 128 by means of a bayonet type of engaging action. As a safety measure, a lock means is preferably provided comprising a lock pin 138 which is received by a slot 140 in the ramp 114 and which also receives the spindle shaft 132. The shaft 132 preferably has a groove 148 for generally locking the spindle shaft 132 in its desired position in the range 114.

Figure 10:
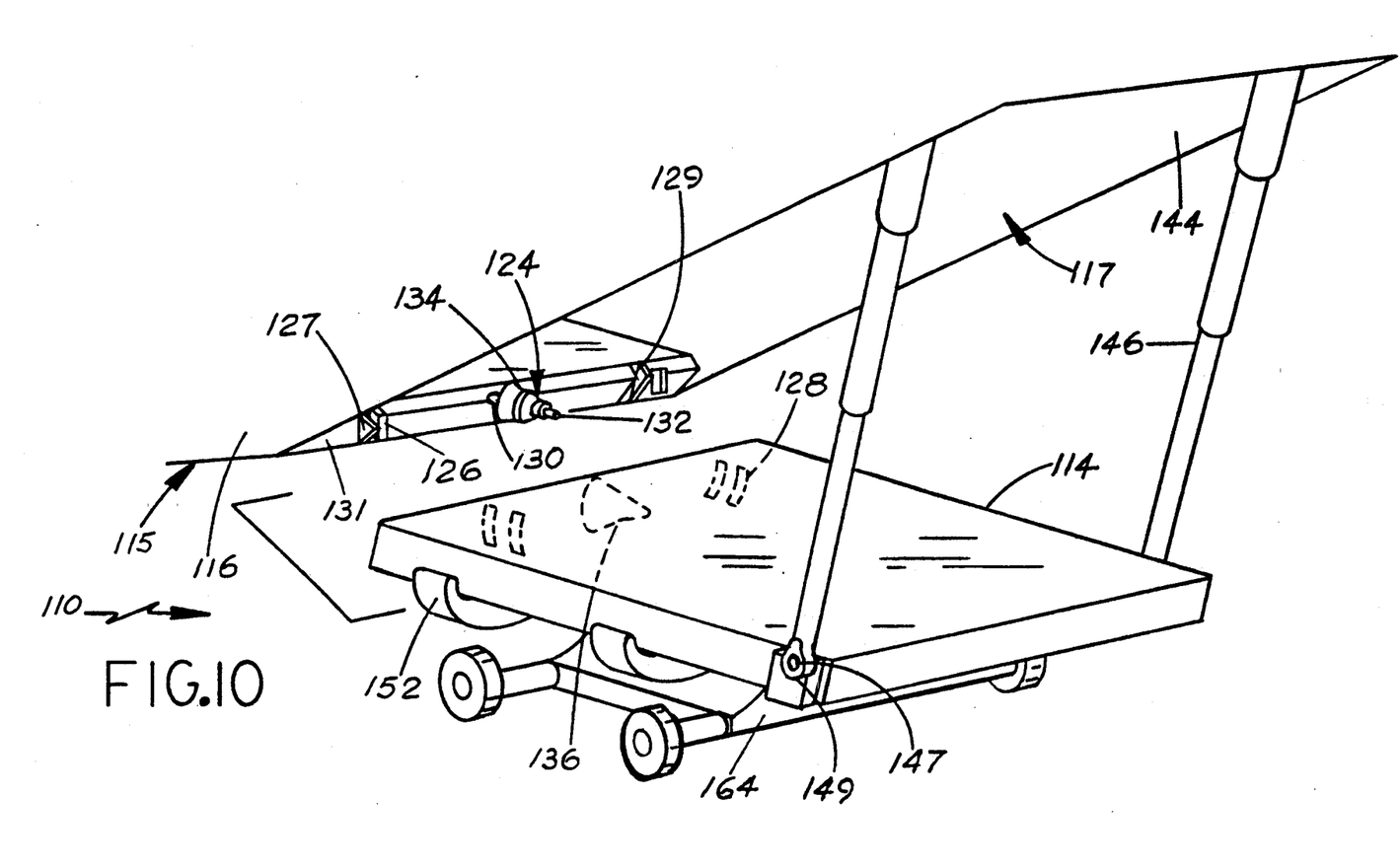
FIG. 10 is a perspective view of the second embodiment of the ramp system of the present invention showing the ramp separated from the spindle and sliding blocks which are shown mounted on the appropriate aircraft structure.
Figure 11:
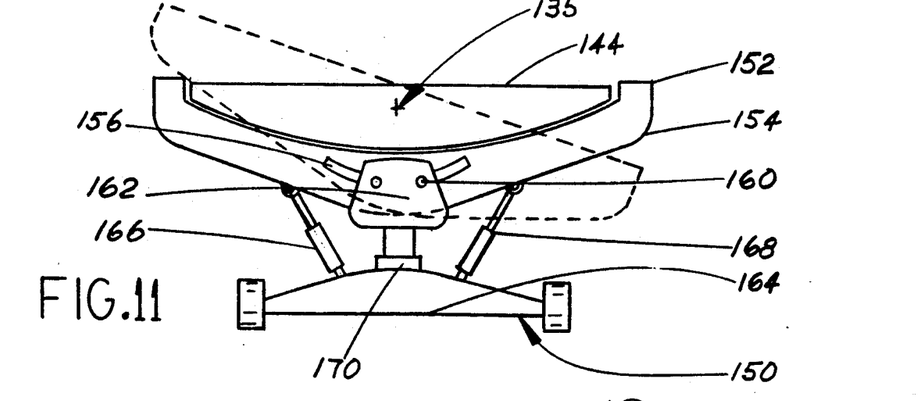
FIG. 11 is a rear elevational view of the dolly and ramp of the second embodiment of the present invention illustrating the rotational capability of the dolly.
Figure 12A:
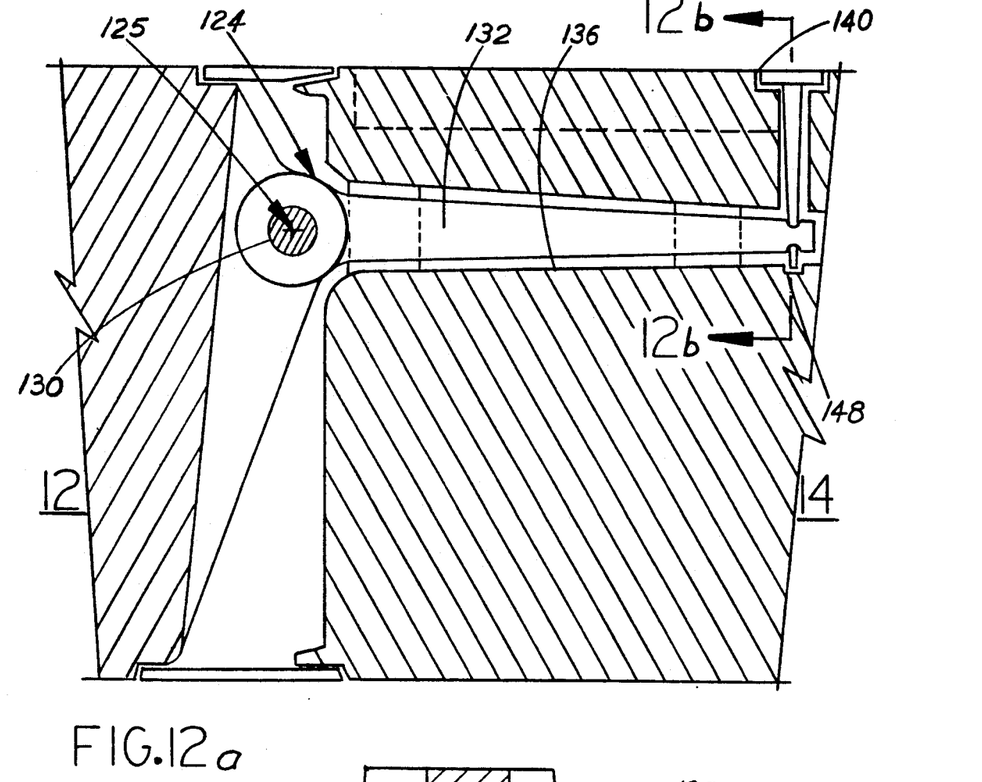
FIG. 12a is a longitudinal sectional view of the spindle, associated portions of the ramp and aircraft structure and lock pin therefor of the second embodiment of the invention.
Figure 12B:
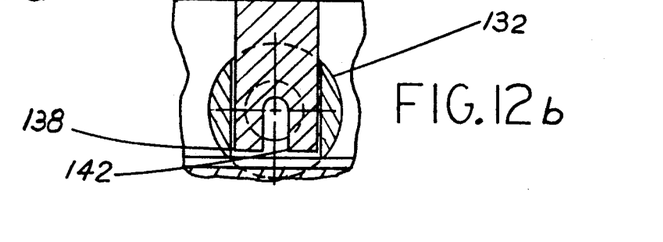

The ramp 114 is also connected, preferably at its rear lateral end portions to a second suitable aircraft structure 144 by means of preferably a pair of hydraulic actuators 146, as shown in FIG. 10. The connection of the actuators 146 preferably allows a degree of longitudinal rotational movement of the actuators 46 relative to the aircraft structure 144 in order to allow the actuators 146 to rotate the ramp 114 relative to the second aircraft structure 144. Actuators 146 preferably work generally independently of each other and thereby rotate the ramp 114 relative to the second aircraft structure 144 and also secure the ramp 114 in the desired position within the range of rotational movement provided by the actuators 146 as well as the spindle 124. Thus, the actuators 146 provide secure positioning of the ramp 114 at any desired position within its longitudinal and lateral rotational range of positions. The actuators 146 are preferably detachably connected to the ramp 114 by means of bolts 147 (or pins or other structures which allow quick attachment) which pass through and thereby secure the lower ends 149 of the actuators 146 to preferably rear portions of the ramp 114. The lower ends 149 are preferably heim joints in order to allow the ramp a degree of lateral rotational motion relative to the ends 149 of the actuators 146 to enable the actuators 146 to laterally rotate the ramp 114.

As with rollers 26 and tracks 28 of embodiment 10, blocks 126 and tracks 128 of embodiment 110 are provided to minimize undesired yaw movement of the ramp 114 relative to the aircraft structure 116. The blocks 126 and tracks 128 are preferably a pair of blocks 126 and tracks 128 although they may instead be a plurality of pairs or sets of blocks 126 and tracks 128. The pair of blocks 126 are preferably mounted on a rear portion of the first aircraft structure 116, and the pair of tracks are preferably mounted on an adjoining front portion of the ramp 114. The blocks 126 are preferably in general alignment with the axis of rotation 125 of the spindle hinge 130 to allow lateral rotation of the ramp 114 relative to the first aircraft structure 116 while still allowing longitudinal rotation of the ramp 114 relative to the first aircraft structure 116. In all other respects, the moveable means 126 and tracks 128 are structurally and functionally identical to the corresponding moveable means 26 and tracks 28 of embodiment 10 so their further description will not be repeated.

Embodiment 110 also includes a dolly 150 to facilitate removal and installation of the ramp 114. Dolly 150 includes a platform 154 having gripping members 152 and longitudinal end portions 158, track 156, rollers 160, base 164, longitudinal base end portions 162, hydraulic actuators 166 and 168 and telescoping guide or support structure 170. Actuators 166 and 168 in conjunction with track 156 and rollers 160 provide lateral rotational movement of the platform 154 relative to the base 164. In addition, actuators 166 and 168 in conjunction with telescoping guide or support structure 170 provide generally vertical movement of the platform 154 relative to the base 164. Aside from actuator 168 and telescoping structure 170 and the vertical movement capability these structures provide, dolly 150 is functionally and structurally identical to dolly 50 so its description will not be repeated. In all other respects, embodiment 110 is functionally and structurally identical to embodiment 10 so its further description will not be repeated.

Accordingly, there has been provided, in accordance with the invention, a ramp system which fully satisfies the objectives set forth above. It is to be understood that all terms used herein are descriptive rather than limiting. Although the invention has been described in conjunction with the specific embodiment set forth above, many alternative modifications and variations will be apparent to those skilled in the art in light of the disclosures set forth herein. Accordingly, it is intended to include all such alternatives, embodiments, modifications, and variations that fall within the scope of the invention as set forth in the claims set forth hereinbelow.

We claim:

1. A ramp system for a vehicle, comprising:
    a spindle rotationally mounted on a vehicle structure;
    a ramp detachably connected to said spindle, said spindle allowing rotational movement of said ramp relative to the vehicle structure; and
    means for securely positioning said ramp in any desired position within a desired range of rotational movement of said ramp relative to the vehicle structure.

2. The ramp system of claim 1 further including a means for minimizing undesired fore, aft and lateral movement of said ramp relative to the vehicle structure.

3. The ramp system of claim 2 wherein said means for minimizing includes a set of moveable members and guide tracks mounted on adjacent portions of said ramp and the vehicle structure.

4. The ramp system of claim 3 wherein said set of moveable members and tracks is a plurality of sets of moveable members and tracks.

5. The ramp system of claim 1 wherein said means for securely positioning is a pair of hydraulic actuators connected to lateral end portions of said ramp for providing controlled longitudinal and lateral rotational movement to said ramp and for securing said ramp in any desired position within a desired range of the rotational movement.

6. The ramp system of claim 1 further including a hinge for rotatably interconnecting said ramp and the vehicle structure.

7. The ramp system of claim 1 wherein said spindle is hingedly connected to said ramp to allow longitudinal rotational movement of said ramp section relative to said vehicle structure and wherein said spindle is connected to said ramp by means of at least one bearing to allow lateral rotational movement of said ramp relative to the vehicle structure.

8. 1. A ramp system for a vehicle, comprising:
    a fore section for connection to a vehicle structure to allow said fore section to rotate relative to the vehicle structure;
    an aft section;
    a spindle detachably interconnecting said fore section and said aft section, said spindle allowing rotational movement of said aft section relative to said fore section; and
    means for securely positioning said aft section in any desired position within a desired range of rotational movement of said aft section relative to said fore section.

9. The ramp system of claim 8 further including a means for minimizing undesired fore, aft and lateral movement of said aft relative to said fore section.

10. The ramp system of claim 9 wherein said means for minimizing includes a set of rollers and tracks mounted on adjacent portions of said aft section and said fore section section.

11. The ramp system of claim 8 wherein said means for securely positioning is a pair of hydraulic actuators connected to lateral end portions of said aft section for providing controlled longitudinal and lateral rotational movement to said aft section and for securing said aft section in any desired position within a desired range of the rotational movement.

12. The ramp system of claim 8 further including a hinge for rotatably interconnecting said fore section and the vehicle structure.

13. The ramp system of claim 8 wherein said spindle is hingedly connected to said fore section to allow longitudinal rotational movement of said aft section relative to said fore section and wherein said spindle is connected to said aft section by means of at least one bearing to allow lateral rotational movement of said aft section relative to said fore section.

14. The ramp system of claim 8 further including a lock means for detachably securing connection of said aft section to said fore section.

15. In combination with a vehicle having an opening for loading and unloading, a ramp system, comprising:
   a fore section;
   means for connecting said fore section to a first vehicle structure at the opening, said means allowing rotational movement of said fore section relative to the vehicle structure;
   an aft section;
   a spindle detachably interconnecting said fore section and said aft section, said spindle allowing longitudinal and lateral rotational movement of said aft section relative to said fore section; and
   means for securely positioning said aft section in any desired position within a range of the rotational movement.

16. The ramp system of claim 15 further including a means for minimizing undesired fore, aft and lateral movement of said aft section relative to said fore section.

17. The ramp system of claim 16 wherein said means for minimizing includes a set of rollers and tracks mounted on adjacent portions of said fore and aft sections.

18. The ramp system of claim 17 further including a means for moving said aft section into engagement position with said fore section, said means for moving having a gripping member for gripping and holding said aft section, and said gripping member being rotatable to allow said means for moving to properly engage said set of rollers and tracks for secure connection of said fore and aft sections.

19. The ramp system of claim 15 wherein said means for securely positioning is a pair of hydraulic actuators connected to a second vehicle structure and to lateral end portions of said aft section for providing controlled longitudinal and lateral rotational movement to said aft section relative to said fore section and for securing said aft section in any desired position within a desired range of the rotational movement.

20. The ramp system of claim 15 wherein said means for connecting is a hinge mounted at adjacent portions of said fore and aft sections.

21. The ramp system of claim 15 wherein said spindle is hingedly connected to said fore section to allow longitudinal rotational movement of said aft section relative to said fore section and wherein said spindle is connected to said aft section by means of at least one bearing to allow lateral rotational movement of said aft section relative to said fore section.

22. The ramp system of claim 15 further including a lock means for detachably securing connection of said aft section to said fore section.

23. In combination with an aircraft having an opening for loading and unloading, a ramp system, comprising:
   a fore section;
   a hinge for connecting said fore section to a first aircraft structure at the opening, said hinge allowing pitching movement of said fore section relative to the first aircraft structure;
   an aft section;
   a spindle detachably interconnecting said fore section and said aft section, said spindle hingedly connected to said fore section to allow pitching movement of said aft section relative to said fore section, said spindle connected to said aft section by means of at least one bearing to allow roll movement of said aft section relative to said fore section; and
   means for securely positioning said aft section in any desired position within a desired range of pitch and roll movements relative to said fore section.

24. The ramp system of claim 23, further including a means for minimizing undesired yaw movement of said aft section.

25. The ramp system of claim 24 wherein said means for minimizing includes a set of rollers and tracks mounted on adjacent portions of said fore and aft sections.

26. The ramp system of claim 25 further including a dolly for moving said aft section into engagement with said fore section and for connecting said aft section to said fore section, said dolly having an upper surface engaging said aft section, said upper portion being selectively rotatable in a roll direction in order to allow said dolly to engage said rollers with said tracks of said fore and aft section for proper interconnection of said fore and aft sections, and said dolly having a width narrower than the aircraft opening to allow said dolly to be moved into the aircraft through the opening.

27. The ramp system of claim 23 wherein said means for securely positioning includes a pair of hydraulic actuators connected to lateral end portions of said aft section and a second aircraft structure at the opening for providing controlled rotational movement to said aft section and for securing said aft section in any desired position within a desired range of pitch and roll movements.

* * * * *